United States Patent Office 3,476,702
Patented Nov. 4, 1969

3,476,702
CURABLE EPOXY RESIN COMPOSITION
Yoshihiro Yamamoto, Mitsuo Yoshihara, Takeru Ikeguchi, and Sanenobu Sonoda, Ibaraki, Japan, assignors to Nitto Electric Industrial Co., Ltd., a corporation of Japan
No Drawing. Filed Apr. 19, 1967, Ser. No. 631,889
Int. Cl. C08g 23/12, 23/08
U.S. Cl. 260—37      7 Claims

ABSTRACT OF THE DISCLOSURE

A curable epoxy resin composition which comprises as essential components (1) at least one epoxy compound of the general formula:

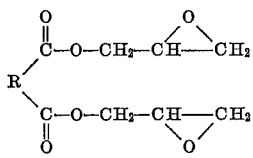

wherein R is a divalent cycloparaffinic or cycloolefinic group, and (2) at least one curing agent selected from the group consisting of (a) aliphatic and alicyclic carboxylic acids and their anhydrides having at least two functional groups and (b) aliphatic and alicyclic amines having at least two functional groups.

---

This invention relates to an improved curable epoxy resin composition. More particularly this invention relates to an epoxy resin composition curable to solid state which is excellent in insulative property and resistance to arc.

It is well known to employ an epoxy resin as an insulating material. However, conventional epoxy resins are relatively high in carbon content in the molecule so that when they are exposed to arc discharge they are carbonized forming a conductive track or path so that the desired insulative property is lost. It has been proposed to incorporate into an organic insulating material a thermally stable inorganic filler such as quartz, calcium carbonate, etc. in order to improve the thermal resistivity and thermal conductivity and hence to improve the electrical characteristics such as arc resistance. These organic insulating materials with the inorganic fillers are resistant to arc (resistant to the formation of a conducting path upon exposure to arc) for a more prolonged period of time than the same insulating materials but not containing the fillers. However, even with the so filled materials, once a conductive track is formed, the track portion is covered by sooty free carbon so that the insulative property is entirely lost. Therefore, the said materials cannot be used again.

It has been proposed to prevent the formation of a discharge path and of free carbon on and around the path when exposed to arc, by incorporating into an organic insulating material a metal hydroxide such as aluminum hydroxide, magnesium hydroxide, etc. However, no fully satisfactory result has been attained thereby.

Therefore, the principal object of this invention is to provide a novel epoxy resin composition which, when cured, is resistant to arc for a prolonged period of time and which, even when a conductive track is temporarily formed due to fusion by a local high temperature upon exposure to arc, would not form carbonized track so that it will recover the insulative property if the arc is removed.

Briefly, the epoxy resin composition of this invention comprises (1) at least one epoxy compound of the formula:

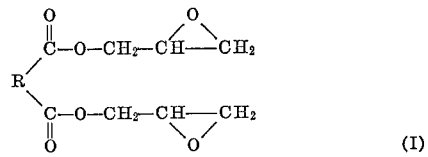

wherein R is a divalent cycloparaffinic or cycloolefinic group, and (2) at least one curing agent selected from the group consisting of (a) aliphatic and alicyclic carboxylic acids having at least two functional groups and (b) aliphatic and alicyclic amines having at least two functional groups.

One of the important features of this invention is to use a particular epoxy compound of the Formula I wherein the content of C—C unsaturation is extremely low so that the resulting cured resin would not form any undesirable amount of free carbon even when exposed to arc. This concept is entirely different from conventional ones where increase in arc resistance has been tried by incorporating inorganic fillers in an organic insulating material.

Examples of divalent cycloparaffinic groups represented by R in the Formula I are those of cyclohexane, cyclopentane, etc. One or more of hydrogens on the ring forming carbons may be replaced with methyl group(s). Examples of divalent cycloolefinic groups represented by R in the Formula I are those of cyclohexene, cyclopentene, etc. and here again they may contain at least one methyl substituent.

Dibasic aliphatic acid (e.g. adipic acid, succinic acid, etc.) residue cannot be used as R because the resulting resin would be poor in thermal stability. Further, aromatic hydrocarbon residue having many unsaturations such as those having a benzene ring cannot be used for R because the resulting resin, when exposed to arc, would form a large amount of free carbon with loss of desirable insulative property.

Among preferable examples of the compounds of the Formula I are diglycidyl hexahydrophthalate, diglycidyl tetrahydrophthalate, diglycidyl hexahydroterephthalate, diglycidyl tetrahydroterephthalate, diglycidyl hexahydroisophthalate, diglycidyl tetrahydroisophthalate, diglycidyl cyclopentanedicarbonate, diglycidyl cyclopentenedicarbonate, etc. which may be prepared by reacting epichlorohydrin with the corressponding carboxylic acid in the presence of a quaternary ammonium salt.

According to the invention, a proper and particular curing agent must be incorporated in the above epoxy compound. The curing agent should not be those which will unduly increase the carbon content in the resulting resin composition. Therefore, it is preferable to employ those which have less or no carbon-carbon unsaturation in the molecule. Such curing agents are selected from aliphatic and alicyclic amines and carboxylic acids having two or more functional groups. Examples of them are those amines such as diethylenediamine, hexamethylenediamine, diethylenetriamine, hexamethylenetetramine, cyclohexylamino propylamine, monoethanolamine, propanolamine, cyclohexanediamine, cyclohexanetriamine. Examples of preferable carboxylic acids are succinic acid, adipic acid, sebacic acid, hexahydrophthalic acid, hexahydroisophthalic acid, tetrahydrophthalic acid, tetrahydroisophthalic acid, hexahydroterephthalic acid, hexahydropyromellitic acid, cyclopentanetetracarboxylic acid, etc. Anhydrides of these acids are also useful. Among the above, most preferable are alicyclic polycarboxylic acid anhydrides.

The curing agent may be used in an amount in a wide range. However, it is preferable to use the curing agent in an amount of 0.5–3 equivalents per one epoxide equivalent in the particular epoxy compound employed.

The essential components of the composition of this invention are the particular epoxy compound explained hereinbefore and the particular curing agent just described above. However, it is also possible to incorporate into the composition any one or more of conventional metal hydroxides and other inorganic fillers, flame retardants and inorganic pigments, to improve the physical properties of the resulting polymers.

Examples of inorganic fillers are aluminum hydroxide, magnesium hydroxide, barium hydroxide, silica, aluminium oxide, titanium oxide, cobalt oxide, zirconium oxide, barium sulfate, calcium carbonate, clay, kaolin clay, slate powder, quartz powder, mica powder, asbestos, etc. The inorganic filler may be added in an amount of about 10–75% by weight based upon the epoxy compound.

As flame retardants, antimony trioxide, borax, etc. may be used. It may be used in an amount of 1–35% by weight of the epoxy compound.

Examples of inorganic pigments useful in this invention are ferric oxide, chrome yellow, Prussian blue, titanium dioxide, colored titanium pigment, titanates such as barium titanate, zinc titanate, lead titanate, magnesium titanate, etc. Since a larger amount of these pigments tends to reduce the arc-resistance of the cured material, the use of the same should be less than 1% by weight based upon the epoxy compound.

Depending upon the particular use of the composition, it is necessary to dilute the same into a proper viscosity. For this purpose any inert solvent for the epoxy resin may be used. However, it is preferable to use a reactive diluent. Examples of useful reactive diluents are acetone, 1,4-butanediol diglycidyl ether, diethyleneglycol diglycidyl ether, triethyleneglycol diglycidyl ether, polyethyleneglycol diglycidyl ether.

In order to further improve the physical properties of the resulting insulating material, a small amount of conventional thermo-setting resins such as conventional epoxy resins, polyester resins, phenol resins, etc. may be added to the composition of this invention. Since the basic concept of the invention is to decrease the carbon-carbon unsaturation in the resulting insulating material to prevent the formation of free carbon when exposed to arc, the amount of the conventional resin (containing a relatively large amount of carbon-carbon unsaturation) to be incorporated into the composition of this invention should be kept minimum and in any event at most 80% by weight based upon the epoxy compound.

The composition of this invention may be used in various insulative applications. Thus, the composition may be shaped into articles, applied as insulating coating or as impregnation material in a conventional manner. Thus, for example, the composition can be used as a material for forming (by means of casting, pouring, etc.) into insulating arms, insulating bolts, mist proof insulators, arc chuters, magnet switches, fuse boxes, fuse pipe ducts, etc. which will be exposed to arc under high voltage. The composition may also be used for surface coating and also as an impregnation material for the production of reinforced plastics, laminates, etc.

The thus applied material may be cured in a manner well known to the art of curing epoxy resin or its articles.

Since the various components of the composition of this invention are substantially free from carbon-carbon unsaturation, the resulting cured material would prevent the undue formation of free and conductive carbon black on the surface when exposed to arc discharge, it is highly resistant to arc and tracking. By incorporating inorganic fillers and/or a small amount of other thermosetting resin(s) into the composition of this invention, arc resistance, insulative property, mechanical strength and other properties may be improved.

The invention will be described in more details by referring to the following examples. However, it should be understood that these examples are given for illustrative purpose only and not for limiting the scope of the invention in any way. In these examples, all parts are by weight.

EXAMPLE 1

A sample 3.0±0.25 mm. thick was prepared by casting from 100 parts of diglycidyl hexahydrophthalate (which shall be referred to as DGHP hereinafter), 108 g. of hexahydrophthalic anhydride (which shall be referred to as HHPA hereinafter) and 1 part of benzyl dimethylamine and then curing at 120° C. for 2 hours and at 200° C. for further 2 hours. The sample is referred to as Sample A. A same sized sample B was prepared from the most generally used bisphenolic resin Epon 828 (produced by Shell Chemical Co.). The sample B was cured under the same conditions as in Sample A. These Samples A and B were tested in respect of arc-resistance by the method of JIS K–6911. No track was formed even after 240–300 seconds in respect of Sample A and there was seen fusion with a result that a hole was formed between the electrodes. A conductive track was formed within 120 seconds in case of Sample B.

In order to determine recovery of insulative property, the surface break-down voltage ratio (the ratio of the breakdown voltage $V_2$ of the part exposed to the arc to the breakdown voltage $V_1$ of the part not exposed to the arc) was measured. For testing each sample was exposed to the arc for 120 seconds under the method of JIS K–6911. The arc resistance recovery ratio $$(V_2/V_1 \times 100)$$

was 0% in respect of Sample B, whereas it was 85–92% in respect of Sample A. Thus, it is shown that, whereas the recovery of the insulative property could not be expected for the Sample B, the recovery was very high in the Sample A.

EXAMPLE 2

A sample 2.2 mm. thick was prepared by casting a blend of 85 parts of tetrahydrophthalic anhydride (which shall be referred to as THPA hereinafter), 100 parts of a quartz powder and 100 parts of diglycidyl tetrahydrophthalate (which shall be referred to as DGTP hereinafter) and curing at 120° C. for 3 hours and at 200° C. for 1 hour. This sample (referred to as C) was compared with a Sample D made by casting and curing Epon 828 under the same conditions.

The Sample C formed a fused track at 240 seconds while Sample D formed a conductive track comprising free carbon. As for arc-resistance recovery rate, the Sample C was 80–85%, while the Sample D was 0%.

EXAMPLE 3

A sample was made by casting a blend of 100 parts of diglycidyl hexahydroterephthalate, 108 parts of hexahydroterephthalic acid and 1 part of benzyldimethylamine, and curing in the same manner as in Example 1. It was very high in the thermal stability. In the arc resistance test, it produced a track in 300 seconds. Its arc resistance recovering rate was 85 to 90%.

EXAMPLE 4

A sample was prepared by casting a blend of 65 parts of cyclopentane tetracarboxylic acid dianhydride, 100 parts of a quartz powder and 100 parts of DGHP and curing at 180° C. for 3 hours and at 240° C. for further 3 hours. It was high in the thermal stability and mechanical strength. In the arc resistance test, even in 300 seconds, a hole was produced in the area of the electrode and substantially no production of a track of free carbon was observed.

EXAMPLE 5

A sample was prepared by casting a blend of 90 parts of HHPA, 20 parts of DER–542 (brominated epoxy produced by Dow Chemical Company), 5 parts of $Sb_2O_3$, 100 parts of a calcium carbonate powder (as a filler) and 100 parts of DGHP, and curing at 120° C. for 5 hours and at 200° C. for another 1 hour. It was very high in the flameproofness. In the arc resistance and arc resistance recovery rate, the same results as in Example 3 were obtained.

EXAMPLE 6

A sample was made from a blend of 80 parts of HHPA, 100 parts of a quartz powder, 50 parts of Epon 828 (produced by Shell Chemical Company) and 50 parts of DGHP. The curing was conducted in the same manner as in Example 1. It showed a remarkable improvement in the arc resistance and arc resistance recovering rate as compared with a similar sample in which 50 parts of DGHP were all replaced with Epon 828.

EXAMPLE 7

A sample of thickness same as in Example 1 was prepared from a blend of 40 parts of Lalomin C–260 (an aliphatic cyclic diamine produced by BASF, Germany) and 100 parts of DGTP. This composition was curable at a low temperature. Thus curing was conducted at 40° C. for 30 hours and then at 60° C. for 2 hours. The sample was flexible. In the test, the same result as in Example 4 was obtained.

EXAMPLE 8

A sample of thickness same as in Example 1 was made by casting a blend of 31 parts of adipic acid and 100 parts of DGHP, and curing at 110° C. for 5 hours and then at 180° C. for 3 hours. It was highly flexible. In the arc resistance test, the same result as in Example 1 was obtained.

EXAMPLE 9

To 100 parts of DGHP, 100 parts of HHPA were dissolved at 60° C. to obtain a transparent solution. To this solution were added 0.5 part of benzyldimethyl amine and 90 parts of aluminum hydroxide, and the mixture was stirred at the room temperature. The resulting mixture was poured into a metallic mould and cured at 100° C. for 6 hours and after-cured at 180° C. for 4 hours to obtain a molded article having an excellent arc resistance.

EXAMPLE 10

A solution was prepared from 100 parts of DGHP, 31 parts of adipic acid and 100 parts of acetone at the room temperature. Kraft paper and non-woven fabric (about 0.25 mm. in thickness) were impregnated with the above solution and dried at 100° C. for 20 minutes. The impregnated papers and non-woven fabrics were alternately laminated to form a 15 layer laminate, which was press-cured at 180° C. and 80 kg./cm.$^2$ for 30 minutes to obtain a rigid laminate (about 3.5 mm. in thickness) with a resin content of about 35% by weight.

What we claim is:

1. A curable epoxy resin composition which comprises as essential components (1) at least one epoxy compound of the general formula:

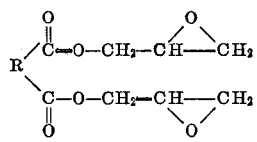

wherein R is a divalent group selected from the class consisting of cyclohexane, cyclopentane, cyclohexene, cyclopentene and derivatives thereof containing at least one methyl group, and (2) at least one curing agent having little or no carbon-carbon unsaturation in the molecule and selected from the group consisting of (a) aliphatic and alicyclic carboxylic acids and their anhydrides having at least two functional groups and (b) aliphatic and alicyclic amines having at least two functional groups.

2. A composition as claimed in claim 1 in which the epoxy compound is selected from the group consisting of diglycidyl hexahydrophthalate, diglycidyl tetrahydrophthalate, diglycidyl hexahydroterephthalate, diglycidyl tetrahydroterephthalate, diglycidyl hexahydroisophthalate, diglycidyl tetrahydroisophthalate, diglycidyl cyclopentanedicarbonate and diglycidyl cyclopentenedicarbonate.

3. A composition as claimed in claim 1 wherein the aliphatic and alicyclic dicarboxylic acids are succinic acid, adipic acid, sebacic acid, hexahydrophthalic acid, hexahydroisophthalic acid, hexahydroterephthalic acid, hexahydropyromellitic acid, cyclopentanetetracarboxylic acid, tetrahydrophthalic acid, tetrahydroisophthalic acid and their anhydrides.

4. A composition as claimed in claim 1 wherein the amines are diethylenediamine, hexamethylenediamine, diethylenetriamine, hexamethylenetetramine, cyclohexylaminopropylamine, monoethanolamine, propanolamine, cyclohexanediamine and cyclohexanetriamine.

5. A composition as claimed in claim 1 wherein the curing agent is used in an amount of 0.5–3 equivalents per epoxide equivalent.

6. A composition as claimed in claim 1 wherein it further comprises an inorganic filler in an amount of 10–75% by weight based on the epoxy compound.

7. A composition as claimed in claim 1 wherein it further comprises other thermosetting resin selected from conventional epoxy resins, polyester resins and phenol resins in an amount at most 80% by weight of the epoxy compound.

References Cited

UNITED STATES PATENTS

| | | |
|---|---|---|
| 2,801,232 | 7/1967 | Suen et al. |
| 2,871,454 | 1/1959 | Langer. |
| 2,992,193 | 7/1961 | Porret et al. |

MORRIS LIEBMAN, Primary Examiner

U.S. Cl. X.R.

260—78.4, 830